(12) United States Patent
Nguyen Van et al.

(10) Patent No.: US 8,676,441 B2
(45) Date of Patent: Mar. 18, 2014

(54) STEERING SUPPORT DEVICE

(75) Inventors: Quy Hung Nguyen Van, Susono (JP);
Seiji Kawakami, Susono (JP);
Katsuhiko Iwazaki, Aichi (JP);
Chumsamutr Rattapon, Susono (JP);
Hiroaki Kataoka, Susono (JP)

(73) Assignee: Toyota Jidosha Kabushiki Kaisha,
Toyota (JP)

( * ) Notice: Subject to any disclaimer, the term of this patent is extended or adjusted under 35 U.S.C. 154(b) by 459 days.

(21) Appl. No.: 12/375,470

(22) PCT Filed: Aug. 10, 2007

(86) PCT No.: PCT/JP2007/065980
§ 371 (c)(1),
(2), (4) Date: Jan. 28, 2009

(87) PCT Pub. No.: WO2008/020615
PCT Pub. Date: Feb. 21, 2008

(65) Prior Publication Data
US 2009/0265062 A1    Oct. 22, 2009

(30) Foreign Application Priority Data

Aug. 16, 2006   (JP) ................. 2006-221978

(51) Int. Cl.
*B62D 6/00*   (2006.01)
(52) U.S. Cl.
USPC .......................................................... 701/41
(58) Field of Classification Search
USPC ............... 701/41, 300, 42; 180/443, 422, 446
See application file for complete search history.

(56) References Cited

U.S. PATENT DOCUMENTS 6,216,079 B1   4/2001  Matsuda
6,473,683 B1 * 10/2002  Nada ............................... 701/82

(Continued)

FOREIGN PATENT DOCUMENTS

JP    62227874 A  * 10/1987  .............. B62D 7/14
JP    A-3-96477      4/1991

(Continued)

OTHER PUBLICATIONS

JPO machine translation of JP 2002-19633.*

(Continued)

*Primary Examiner* — Behrang Badii
*Assistant Examiner* — David Testardi
(74) *Attorney, Agent, or Firm* — Oliff PLC

(57) ABSTRACT

An object of the present invention is to provide a steering assist device which can perform steering assist control having excellent capability to follow up a traveling path by increasing the steering amount in the steering control at a curve entrance. A steering assist device of the present invention is a steering assist device 1 for calculating a steering target value based on a shape of a traveling path on which a vehicle travels, and assisting steering according to the steering target value, wherein it is determined whether the vehicle is traveling a curve entrance of the traveling path, and when it is determined that the vehicle is traveling a curve entrance, a change in the steering target value is increased compared with the case of traveling a part of the path other than a curve entrance. As a result, a steering amount to turn the steering wheel can be increased at a curve entrance, and a delay in the turning of the steering wheel at a curve entrance can be suppressed.

2 Claims, 8 Drawing Sheets

(56) References Cited

U.S. PATENT DOCUMENTS

| | | | |
|---|---|---|---|
| 6,542,800 B2 * | 4/2003 | Kawazoe et al. | 701/41 |
| 7,092,805 B2 * | 8/2006 | Kasahara et al. | 701/41 |
| 7,216,023 B2 * | 5/2007 | Akita | 701/41 |
| 7,373,230 B2 * | 5/2008 | Rattapon et al. | 701/41 |
| 7,389,167 B2 * | 6/2008 | Iwazaki et al. | 701/41 |
| 7,551,996 B2 * | 6/2009 | Shirato et al. | 701/40 |
| 8,086,372 B2 * | 12/2011 | Okuda et al. | 701/41 |
| 2001/0027364 A1 * | 10/2001 | Matsuoka | 701/41 |
| 2005/0225477 A1 * | 10/2005 | Cong et al. | 342/70 |
| 2005/0267661 A1 * | 12/2005 | Iwazaki et al. | 701/41 |
| 2006/0030987 A1 * | 2/2006 | Akita | 701/41 |
| 2009/0198415 A1 * | 8/2009 | Tanaka et al. | 701/41 |

FOREIGN PATENT DOCUMENTS

| | | | | |
|---|---|---|---|---|
| JP | 03114971 A * | 5/1991 | | B62D 5/04 |
| JP | A-7-156818 | 6/1995 | | |
| JP | A-2000-127931 | 5/2000 | | |
| JP | 2001010524 A * | 1/2001 | | B62D 6/00 |
| JP | A-2001-10528 | 1/2001 | | |
| JP | 2002002518 A * | 1/2002 | | B62D 6/00 |
| JP | A-2002-19633 | 1/2002 | | |
| JP | 2002120744 A * | 4/2002 | | B62D 6/00 |
| JP | 2002234456 A * | 8/2002 | | B62D 6/00 |
| JP | 2002308129 A * | 10/2002 | | B62D 6/00 |
| JP | A-2004-268819 | 9/2004 | | |
| JP | 2005343184 A * | 12/2005 | | B62D 6/00 |
| JP | 2005346304 A * | 12/2005 | | G08G 1/16 |
| JP | A-2005-343260 | 12/2005 | | |
| JP | 2006315514 A * | 11/2006 | | |
| JP | 2006318044 A * | 11/2006 | | |
| JP | 2006347461 A * | 12/2006 | | |
| JP | 2007030678 A * | 2/2007 | | |
| JP | A-2007-38696 | 2/2007 | | |
| JP | A-2008-37273 | 2/2008 | | |

OTHER PUBLICATIONS

JPO machine translation of JP 2002-2518.*

JPO machine translation of JP 2005-346304 (original JP document published Dec. 15, 2005).*

JPO machine translation of JP 2006-347461 (original JP document published Dec. 28, 2006).*

JPO machine translation of JP 2002-19633 (original JP document published Jan. 23, 2002).*

JPO machine translation of JP 2002-2518 (original JP document published Jan. 9, 2002).*

* cited by examiner

STEERING SUPPORT DEVICE

TECHNICAL FIELD

The present invention relates to a steering assist device for assisting the steering of a vehicle.

BACKGROUND ART

A known conventional steering assist device to assist the steering of a vehicle is one disclosed in Japanese Patent Application Laid-Open No. 2001-10518, where a view ahead of the vehicle is captured by a camera, positions of a traveling path and a vehicle with respect to the traveling path are detected based on the captured image information, a basic steering assist torque is computed based on the shape of the traveling path, a corrected steering assist torque is computed based on the position of the vehicle, an output steering assist torque is computed based on the basic steering assist torque and the corrected steering assist torque, and the control input of the steering actuator is determined based on the output steering assist torque. This device attempts to improve control accuracy by controlling the steering using a shape parameter of the traveling path and position parameter of the vehicle, which are detected at high accuracy, without using a yaw rate.

DISCLOSURE OF THE INVENTION

However, in this kind of steering assist device, when the vehicle approaches a curve entrance, a delay in the turning of the steering wheel may occur. In this case, because of the delay in the turning of the steering wheel, the vehicle does not follow up the traveling path, and the driver of the vehicle feels a sense of incongruity.

With the foregoing in view, it is an object of the present invention to provide a steering assist device which can perform steering assist control having excellent capability to follow up the traveling path, by increasing the steering amount based on the steering control at a curve entrance.

In other words, a steering assist device of the present invention is a steering assist device for calculating a steering target value based on a shape of a traveling path on which a vehicle travels, and assisting steering according to the steering target value, comprising: determination means for determining that the vehicle is traveling a curve entrance of the traveling path; and steering control means for relaxing a steering target value change restriction when it is determined by the determination means that the vehicle is traveling a curve entrance, compared with the case of traveling a part of the path other than a curve entrance.

According to this invention, the steering amount to turn the steering wheel at a curve entrance can be increased by relaxing the steering target value change restriction when it is determined that the vehicle is traveling a curve entrance. Thereby a delay in the turning of the steering wheel at a curve entrance can be suppressed. As a result, the vehicle can travel the traveling path, and the steering assist control, which has excellent capability to follow up the traveling path, can be implemented.

In the steering assist device according to the present invention, it is preferable that the steering control means relaxes the steering target value change restriction when a direction of a curve of the traveling path and a steering direction by a driver of the vehicle match. Also in the steering assist device according to the present invention, it is preferable that the steering control means relaxes the steering target value change restriction according to the relaxation of restriction of a curvature change rate of the traveling path.

According to the present invention, steering assist control, which has excellent capability to follow up a traveling path, can be implemented by increasing the steering amount, based on the steering control, when traveling at a curve entrance.

BEST MODE FOR CARRYING OUT THE INVENTION

Embodiments of the present invention will now be described with reference to the accompanying drawings. In the description of the drawings, the same composing elements are denoted with a same reference symbol, for which redundant description is omitted.

Figure 1:
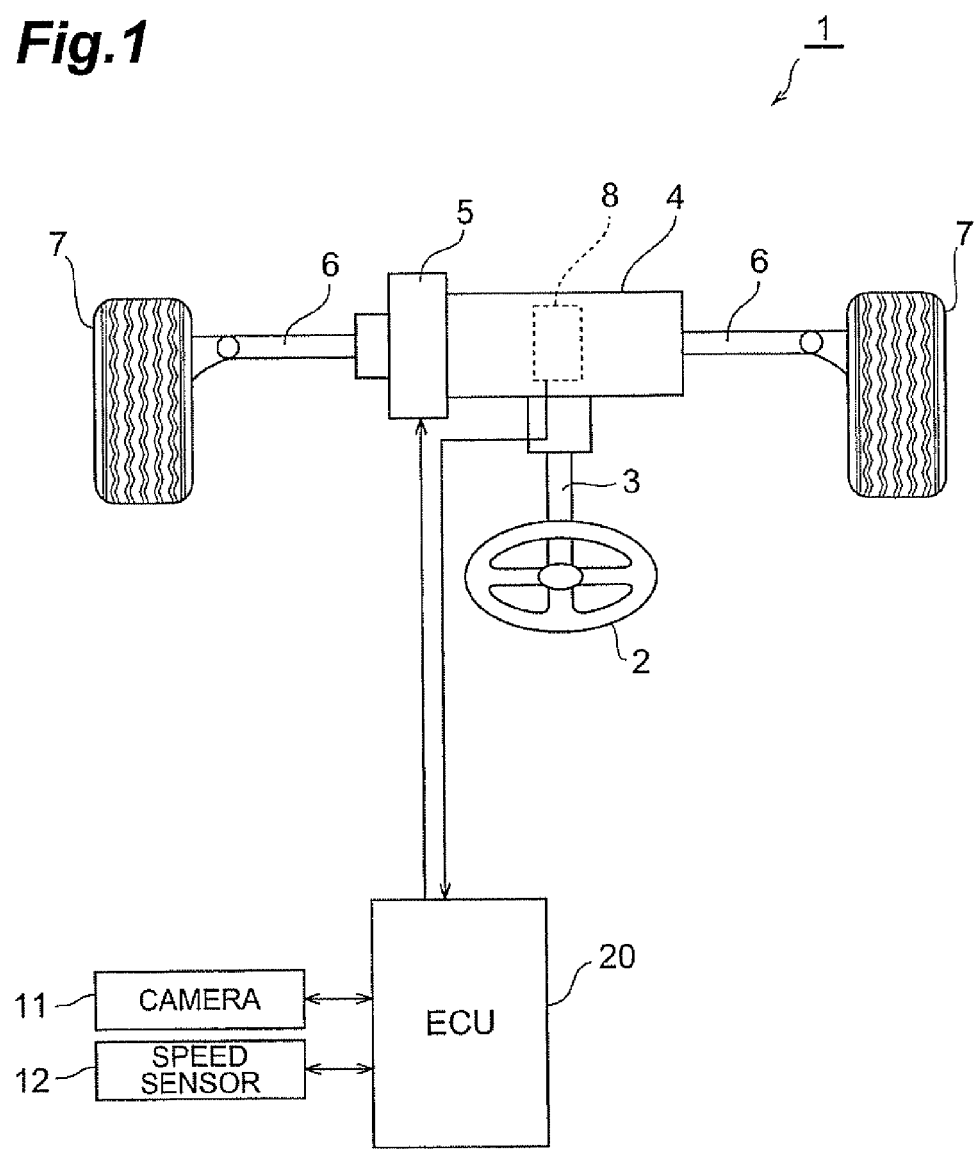
FIG. 1 is a diagram depicting a general configuration of a steering assist device according to an embodiment of the present invention.

FIG. 1 is a diagram depicting a general configuration of a steering assist device according to an embodiment of the present invention.

As FIG. 1 shows, the steering assist device 1 according to the present invention is a device to assist steering for a driver of a vehicle by supplying steering torque to a steering force transmission system of the vehicle, and is used to control [a vehicle] to stay in a lane, that is, to maintain the position of the vehicle at the center of a lane of a transmission path, for example. The steering force transmission system of a vehicle is comprised of a steering shaft 3, a gear unit 4 and tie rods 6, as the major components. The steering shaft 3 is connected to a steering wheel 2, and transmits the steering force of the steering wheel 2 to the gear unit 4 and the tie rods 6.

The gear unit 4 converts the steering torque transmitted from the steering shaft 3 into a force in the horizontal direction. For the gear unit 4, rack and pinion gears, for example, are used. The gear unit 4 receives the assist force of an assist motor 5, and steers the wheels 7 by moving the tie rods 6.

A torque sensor 8 is installed in the gear unit 4. The torque sensor 8 functions as steering torque detection means for detecting the steering torque of the steering wheel 2. For this torque sensor 8, a sensor, where a torsion bar (not illustrated) is placed between the steering shaft 3 and a pinion shaft (not illustrated) and the torsion of the torsion bar generated according to the steering torque is detected by two rotary sensors (not illustrated), for example, is used.

The motor 5 is a motor for assisting the steering force of the steering wheel 2, and provides an assist force according to the steering torque to the steering force transmission system, for example. In FIG. 1, a rack assist type, which provides an assist force to the rack, is shown as the motor 5, but a column assist type and other types may be used.

In the steering assist device 1, an ECU (Electronic Control Unit) 20 is installed. The ECU 20 performs control processing for the entire device, and is comprised of a CPU, ROM, RAM, input signal circuit, output signal circuit and power supply circuit, for example. Also a camera 11 is installed in the steering assist device 1. The camera 11 functions as image capturing means for capturing an image in front of the vehicle, and is a CCD camera, for example. The image information captured by the camera 11 is input to the ECU 20.

The ECU 20 functions as vehicle position detection means for detecting the position of the vehicle with respect to the width direction of the traveling path (road) based on the image information. For example, the ECU 20 processes a captured image, recognizes the white line included in the image information, and detects the position of the vehicle with respect to the width direction of the traveling path on the shape and position of the recognized white line. The positional deviation of the vehicle from the center position of the lane is called an "offset".

The ECU 20 also functions as vehicle orientation detection means for detecting the orientation of the vehicle with respect to the white line of the traveling path based on the image information. For example, the ECU 20 processes a captured image, recognizes the white line included in the image information, and detects the orientation of the vehicle with respect to the white line based on the direction of the recognized white line that extends.

The ECU 20 also functions as curve direction estimation means for estimating the curve direction of the traveling path based on the image information. For example, the curve direction of the traveling path is estimated based on the direction of the white line that extends. The curve of the traveling path refers to the curve of the traveling path at a predetermined curvature or more, and includes the corner of the traveling path.

The ECU 20 also functions as steering direction estimation means for estimating the steering direction of the driver of the vehicle based on the steering operation of the driver. For example, the ECU 20 detects the steering torque as the steering operation by the driver, and estimates the steering direction of the driver based on the state of the steering torque.

The ECU 20 also functions as curve entrance determination means for determining whether the vehicle is currently traveling a curve entrance of the traveling path. For example, it is determined whether the vehicle is currently traveling a curve entrance based on whether the estimated curve curvature value increased a predetermined value or more in image processing, for example. The ECU 20 also functions as a steering control means for increasing the steering torque change amount, when the vehicle is currently traveling the curve entrance of the traveling path, compared with the case of traveling a part of the traveling path other than a curve entrance.

A speed sensor 12 is also installed in the steering assist device 1. The speed sensor 12 functions as speed detection means for detecting the traveling speed of the vehicle. A wheel speed sensor, for example, is used for the speed sensor 12.

Figure 2:
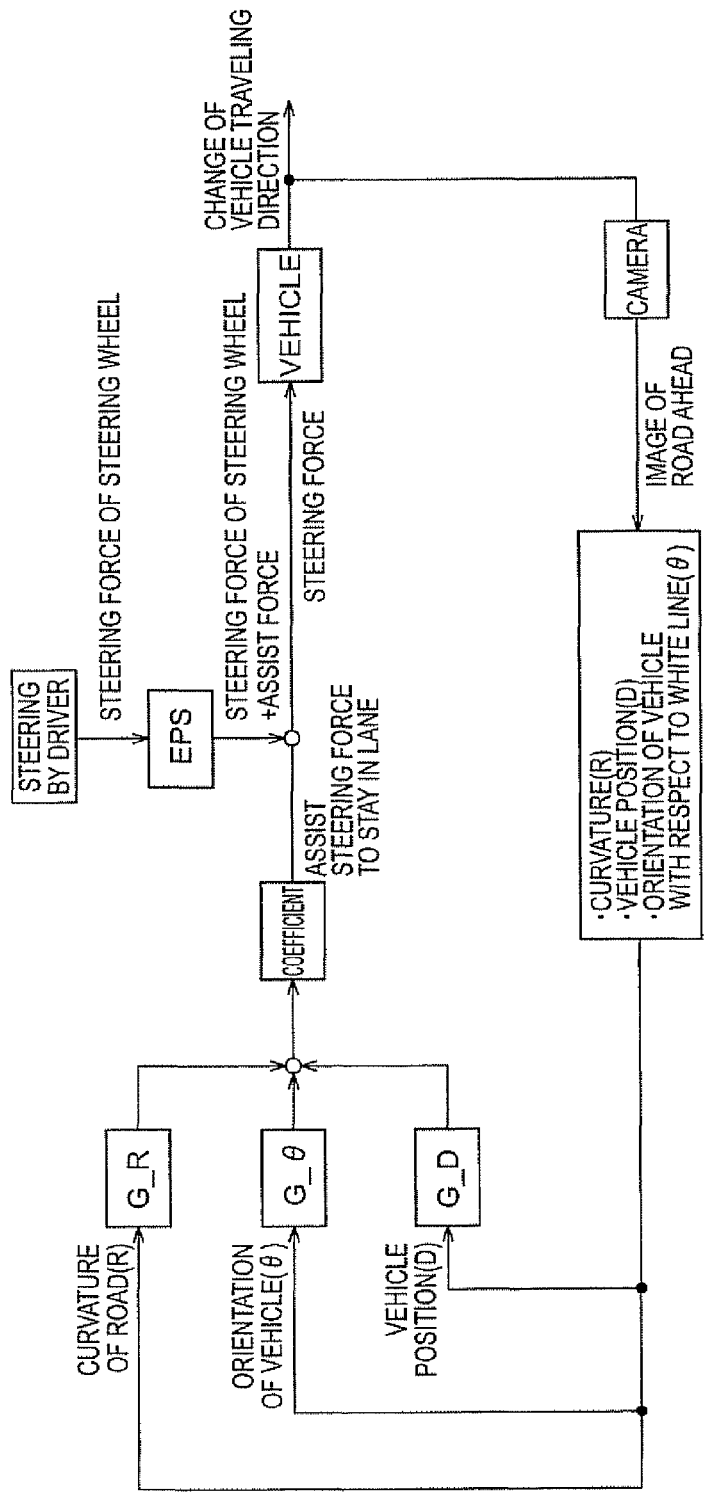
FIG. 2 is a block diagram depicting steering assist control in the steering assist device in FIG. 1.

FIG. 2 is a block diagram depicting a basic control block of the steering assist control in the steering assist device 1 according to the present embodiment.

As FIG. 2 shows, in the steering assist device 1, image information on the traveling path ahead of the vehicle, captured by the camera 11, is input to the ECU 20, and based on this image information, the curvature of the traveling path (R), vehicle position (D) and the orientation of the vehicle with respect to the white line (θ) are detected. The curvature of the traveling path is calculated by extracting the white line of the traveling path and detecting the curvature of the white line, for example. The curvature value calculated in this way includes noise, so filter processing is performed. By this filter processing, the change rate of the curvature value is controlled to be minimal.

The vehicle position is a position of the vehicle with respect to the width direction of the traveling path. The vehicle position is computed based on the detected state of the white line. The orientation of the vehicle with respect to the white line is computed based on the detected states of the white line to the left and right of the vehicle.

The curvature of the traveling path, the vehicle position, and the orientation of the vehicle are multiplied by a predetermined gain (G) respectively, and used for calculating a target transverse acceleration. The target transverse acceleration is a transverse acceleration required for returning the vehicle back to the center of the lane. By multiplying the target transverse acceleration by a predetermined coefficient, a steering torque required to stay in the lane (assist steering torque) is calculated. This steering torque is applied to the steering mechanism.

On the other hand, an actuator (motor 5) of an electric power steering (EPS) applies an assist force according to the steering force of the steering wheel by the driver of the vehicle. So the steering force of the steering wheel and the assist force are applied from the actuator of the electric power steering to the steering mechanism.

In other words, the steering force of the steering wheel, the assist force of the steering force of the steering wheel and the assist steering force to stay in the lane are applied to the steering mechanism as the steering force. The traveling direction of the vehicle changes as the steering force is received.

Figure 3:
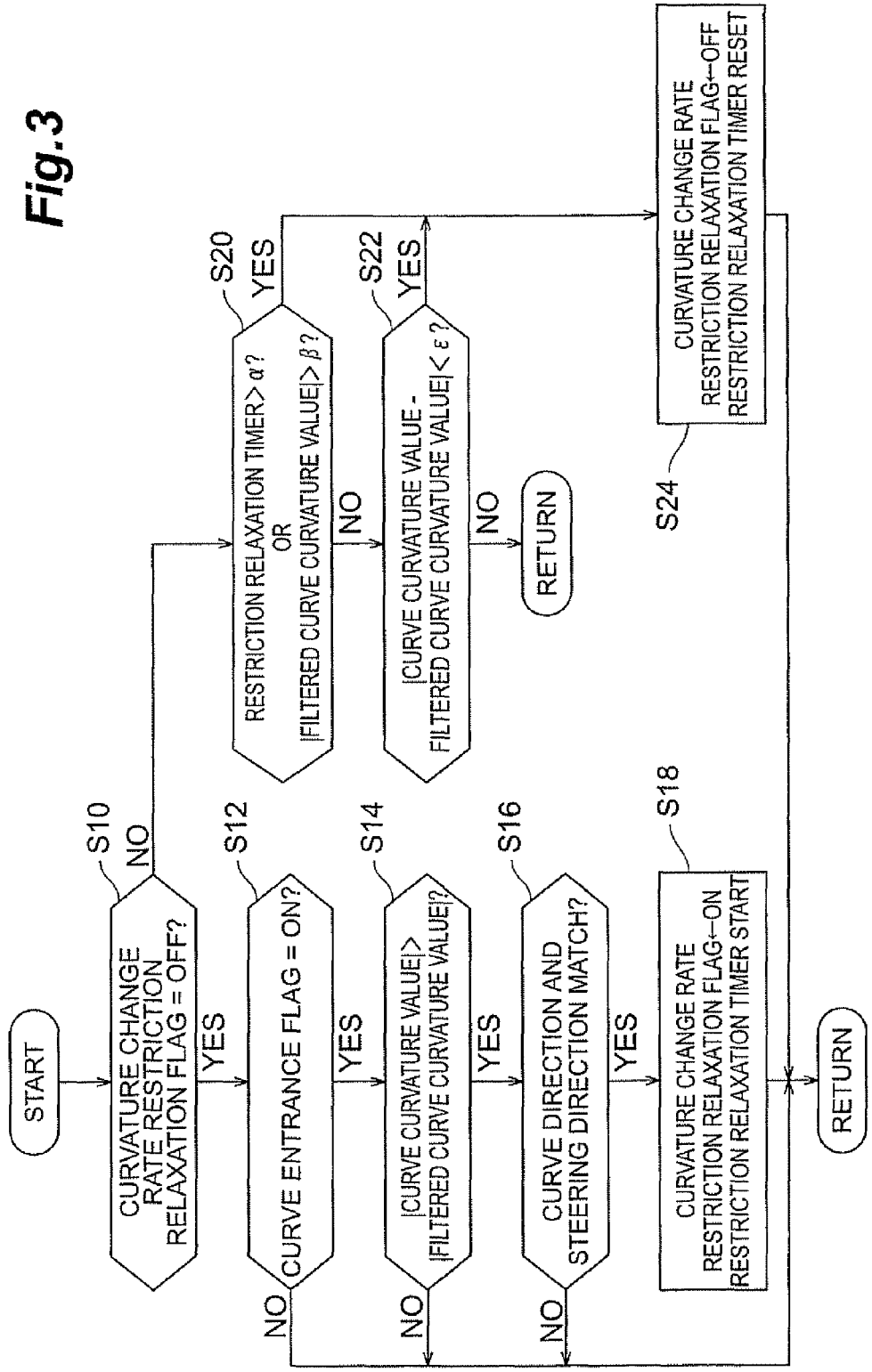
FIG. 3 is a flow chart depicting a curvature change rate relaxation processing in the steering assist device in FIG. 1.

FIG. 3 is a flow chart depicting a curvature change rate restriction relaxation processing in the steering assist device 1 according to the present embodiment.

The curvature change rate restriction relaxation processing is a processing for setting (ON) or resetting (OFF) a curvature change rate restriction relaxation flag. A series of control processing's in FIG. 3 is repeatedly executed by the ECU 20 at a predetermined cycle, for example.

First, as S10 in FIG. 3 shows, it is determined whether the curvature change rate restriction relaxation flag is OFF. The curvature change rate restriction relaxation flag is a flag to indicate whether the restriction of the curvature change rate of the traveling path is relaxed.

If the curvature change rate restriction relaxation flag is OFF in S10, it is determined whether a curve entrance flag is ON (S12). The curve entrance flag is a flag to indicate whether the traveling path is at the curve entrance. If the curve entrance flag is not ON in S12, the control processing ends. If the curve entrance flag is ON in S12, on the other hand, it is determined whether the absolute value of the curvature value of the curve is greater than the absolute value of a filtered curvature value (S14). The filtered curvature value is a curvature value after being filtered by a noise filter.

If the absolute value of the curvature value of the curve is not greater than the absolute value of the filtered curvature value in S14, the control processing ends. If the absolute value of the curvature value of the curve is greater than the absolute value of the filtered curvature value in S14, on the other hand, it is determined whether the curve direction of the traveling path and the steering direction of the driver of the vehicle match (S16).

The curve direction of the traveling path is determined based on whether the curvature of the curve is positive or negative, for example. To calculate the curvature of the traveling path, the white line of the traveling path is extracted from the captured image, for example, then the curvature of the white line is calculated, and based on the curvature of the white line, the curvature of the traveling path is calculated. In this case, the curvature of the traveling path is calculated regarding the curvature to the right direction as positive, and the curvature to the left direction as negative. Therefore, if the curvature of the traveling path is positive, it is determined that the curve direction is the right direction, and if the curvature of the traveling path is negative, it is determined that the curve direction is the left direction.

The steering direction by the driver is determined based on a right turn steering flag or left turn steering flat, for example. The right turn steering flag is a flag to indicate whether the steering direction is a right turn or not, and is ON if the steering direction is a right turn, and OFF if the steering direction is not a right turn. The left turn steering flag is a flag to indicate whether the steering direction is a left turn or not, and is ON if the steering direction is a left turn, and OFF if the steering direction is not a left turn.

If the curvature of the traveling path is positive and the right turn steering flag is ON, it is determined that the curve direction of the traveling path and the steering direction by the driver of the vehicle match. If the curvature of the traveling path is positive and the right turn steering flag is OFF, then it is determined that the curve direction of the traveling path and the steering direction by the driver of the vehicle do not match.

If the curvature of the traveling path is negative and the left turn steering flag is ON, it is determined that the curve direction of the traveling path and the steering direction by the driver of the vehicle match. If the curvature of the traveling path is negative and the left turn steering flag is OFF, on the other hand, it is judged that the curve direction of the traveling path and the steering direction by the driver of the vehicle do not match.

If it is determined that the curve direction of the traveling path and the steering direction by the driver of the vehicle do not match in S16, the control processing ends. If it is determined that the curve direction of the traveling path and the steering direction by the driver of the vehicle match in S16, on the other hand, the curvature change rate restriction relaxation flag is set ON, and the restriction relaxation timer is started (S18).

By this curvature change rate restriction relaxation flag being set ON, the restriction of the change rate of the curvature value of the traveling path, which is repeatedly calculated at a predetermined cycle, is relaxed. In other words, the noise reduction function of the filter to reduce noise of the curvature value is relaxed, and as a result, a large fluctuation of the curvature value is allowed. By this, a curvature value according to the curve of the traveling path can be calculated.

If the curvature change rate restriction relaxation flag is not OFF in S10, it is determined whether the restriction relaxation timer exceeds time $\alpha$, or whether the absolute value of the filtered curve curvature value exceeds $\beta$ (S20). The time $\alpha$ is a time value which is set in the ECU 20 in advance. $\beta$ is a curvature value which is set in the ECU 20 in advance.

If the restriction relaxation timer exceeds the time $\alpha$ or the absolute value of the filtered curve curvature value exceeds $\beta$ in S20, [processing] moves to S24. If the restriction relaxation timer does not exceed the time $\alpha$ and the absolute value of the filtered curve curvature value does not exceed $\beta$ in S20, on the other hand, the absolute value of the value which resulted when the filtered curve curvature value is subtracted from the curve curvature value is smaller than $\epsilon$ (S22). $\epsilon$ is a value which is set in the ECU 20 in advance.

If it is determined that the absolute value of the value which resulted when the filtered curve curvature value is subtracted from the curve curvature value is not smaller than $\epsilon$ in S22, control processing ends. If it is determined that the absolute value which resulted when the filtered curve curvature value is subtracted from the curve curvature value is smaller than $\epsilon$ in S22, on the other hand, processing moves to S24.

In S24, the curvature change rate relaxation flag is set to OFF, and the restriction relaxation timer is reset. Then the control processing ends.

By the curvature change rate restriction relaxation flag being set to OFF, the restriction of the change rate of the curvature value of the traveling path, which is repeatedly calculated at a predetermined cycle, is no longer relaxed. In other words, the noise reduction function of the filter, to reduce noise of the curvature value, is maintained, and as a result, a large fluctuation of the curvature value is suppressed.

According to the curvature change rate restriction relaxation processing, the change rate of the curvature value of the traveling path is relaxed by setting the curvature change rate restriction relaxation flag to ON when the vehicle is traveling a curve entrance of the traveling path. Therefore the curvature value according to the traveling path is calculated at the curve entrance.

Figure 4:
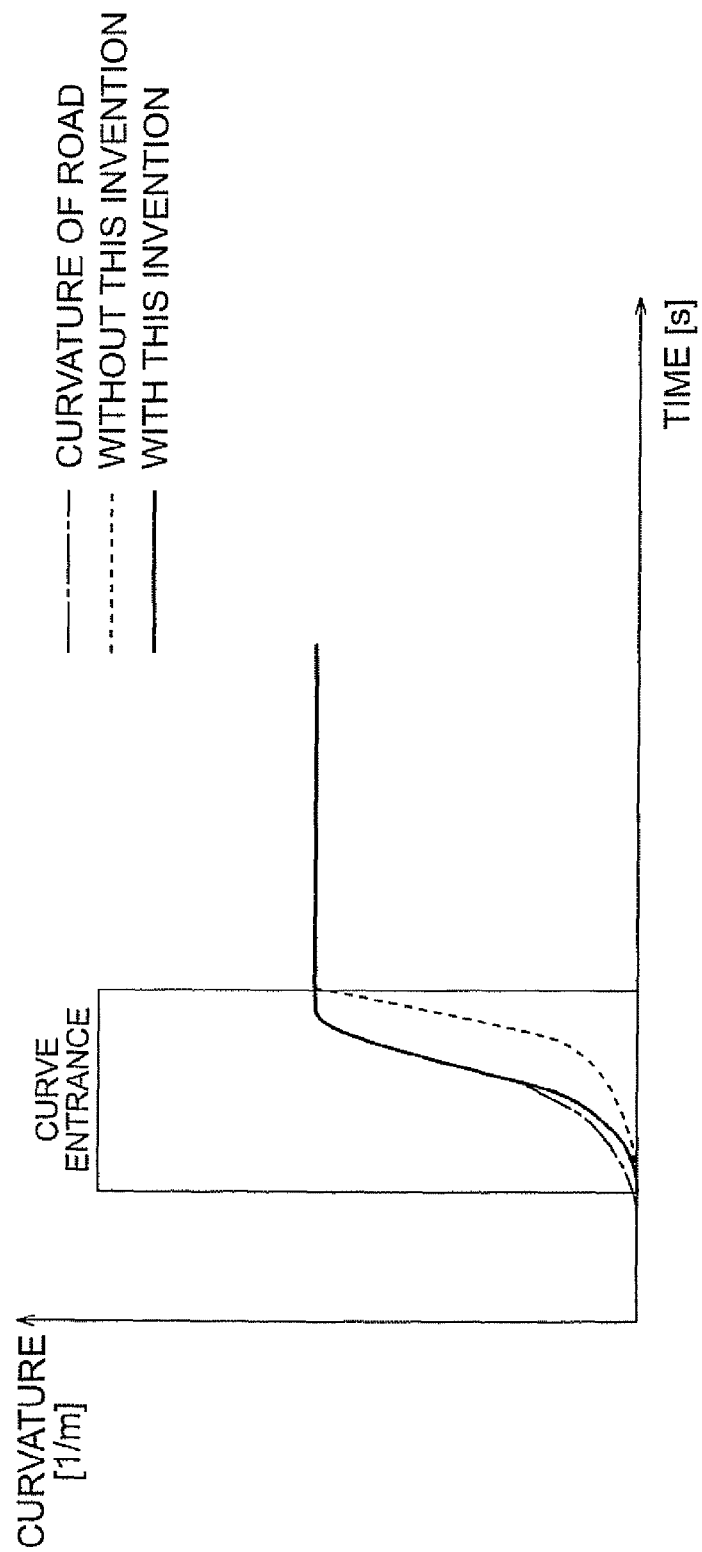
FIG. 4 is a graph depicting a curve curvature value calculated in the steering assist device in FIG. 1.

For example, as FIG. 4 shows, the curvature rate according to the curvature of the road (dash and dotted line in FIG. 4) can be calculated by relaxing the change rate of the curvature value at the curve entrance by the curvature change rate restriction relaxation processing of the present embodiment (solid line in FIG. 4: with this invention). If the change rate of the curvature value is not relaxed at the curve entrance, on the other hand, the curvature value according to the curvature of the road (dash and dotted line in FIG. 4) cannot be calculated, and a rise in the curvature value delays (broken line in FIG. 4: without this invention).

In this case, if a large curvature value according to the traveling path is calculated at the curve entrance, a steering target value, such as the steering torque, is set high accordingly. If the steering torque increases, the steering amount increases, and capability to follow up the curve improves. In addition, an increase in the change rate of the steering torque also increases the steering amount, and capability to follow up the curve improves.

According to the curvature change rate restriction relaxation processing, the curvature change rate restriction relaxation flag is set to OFF, and the noise reduction function of this noise reduction filter for the curvature value recovers when a predetermined time has elapsed since the restriction is relaxed, or when the curvature value becomes greater than a predetermined curvature value (S20 in FIG. 3), so an inappropriate curvature value being calculated due to noise can be suppressed.

Figure 5:
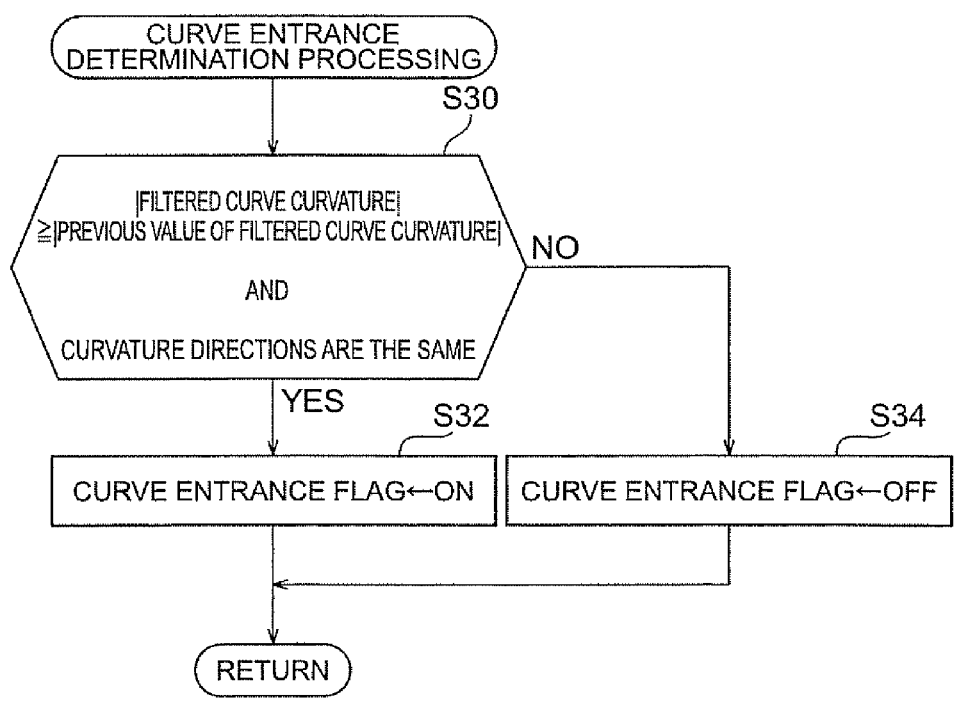
FIG. 5 is a flow chart depicting a curve entrance determination processing in the steering assist device in FIG. 1.

FIG. 5 is a flow chart depicting a curve entrance determination processing in the steering assist device 1 according to the present embodiment.

The curve entrance determination processing is a processing to determine whether the traveling path on which the vehicle is traveling is at a curve entrance or not, and sets (ON) or resets (OFF) the curve entrance flag. A series of control processings in FIG. 5 are repeatedly executed by the ECU 20 as a predetermined cycle, for example.

First, as S30 in FIG. 5 shows, it is determined whether the absolute value of the filtered curve curvature value is a previous absolute value of the filtered curve curvature value or more, and whether the curvature direction of the current curve curvature value and that of a previous curve curvature value are the same. In other words, it is determined whether the curvature value of the traveling path of the vehicle is increasing in a same curve direction or not.

If it is determined that the absolute value of the filtered curve curvature value in S30 is the previous absolute value of the filtered curve curvature value or more, and the curvature direction of the current curve curvature value and that of the previous curve curvature value are the same, the curve entrance flag is set to ON (S32).

It is determined that the absolute value of the filtered curve curvature value in S30 is not more than the previous absolute value of the filtered curve curvature value, or the curvature direction of the current curve curvature value and that of the previous curve curvature value are not the same, on the other hand, then the curve entrance flag is set to OFF (S34). And the curve entrance determination processing ends.

According to this curve entrance determination processing, it can be determined whether the traveling path is at the curve entrance or not.

In the steering assist device 1 according to the present embodiment, this curve entrance determination processing is an example of a method for determining a curve entrance of the traveling path, and other methods may be used to determine a curve entrance. For example, the position of the vehicle may be detected using a GPS system so as to determine a curve entrance based on the map data of the traveling path.

Figure 6:
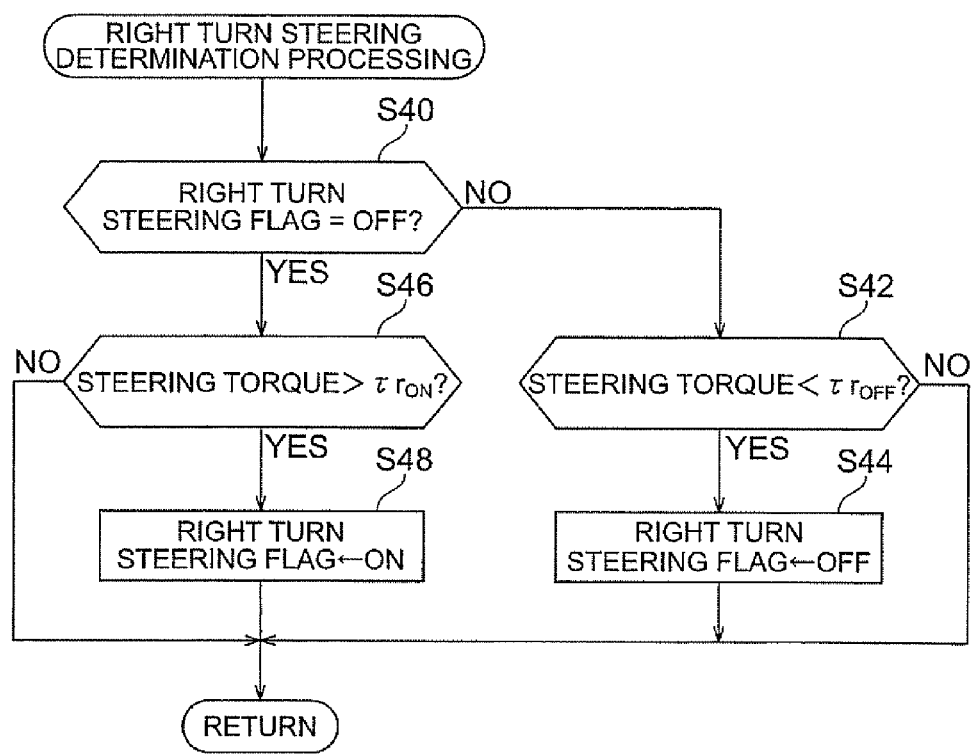
FIG. 6 is a flow chart depicting a right turn steering determination processing in the steering assist device in FIG. 1.

FIG. 6 is a flow chart depicting a right turn steering determination processing in the steering assist device 1 according to the present embodiment.

This right turn steering determination processing is a processing to determine whether the driver of the vehicle is steering to the right or not. A series of control processings in FIG. 6 are repeatedly executed by the ECU 20 at a predetermined cycle, for example.

First, as S40 in FIG. 6 shows, it is determined whether the right turn steering flag is OFF. The right turn steering flag is a flag to indicate whether the steering operation of the steering wheel is a right turn, and ON indicates that it is a right turn, and OFF indicates that it is not a right turn.

If it is determined that the right turn steering flag is not OFF in S40, it is determined whether the steering torque is smaller than the torque value $\tau r_{OFF}$ (S42). The torque value $\tau r_{OFF}$ is a value which is set in the ECU 20 in advance, and a positive value is set. For the steering torque, a torque value detected by the torque sensor 8 is used. This steering torque is detected as positive if it is the right turn steering torque, and negative if it is the left turn steering torque.

If the steering torque is not smaller than the torque value $\tau r_{OFF}$ in S42, it is determined that the right turn steering operation of the steering wheel is continuing, and the right turn steering determination processing ends. If the steering torque is smaller than the torque value $\tau r_{OFF}$ in S42, on the other hand, the right turn steering flag is set to OFF (S44).

If it is determined that the right turn steering flag is OFF in S40, it is determined whether the steering torque is greater than the torque value $\tau r_{ON}$ (S46). The torque value $\tau r_{ON}$ is a value which is set in the ECU 20 in advance, and is a positive value, which is also a value greater than the torque value $\tau r_{OFF}$.

If the steering torque is not greater than the torque value $\tau r_{ON}$ in S46, it is determined that the right turn steering operation of the steering wheel is not being performed, and the right turn steering determination processing ends. If the steering torque is greater than the torque value $\tau r_{ON}$ in S46, on the other hand, it is determined that right turn steering is performed, and the right turn steering flag is set to ON (S48). And the right turn steering determination processing ends.

According to this right turn steering determination processing, it can be determined whether the driver of the vehicle is steering to the right based on the steering torque of the steering wheel.

Figure 7:
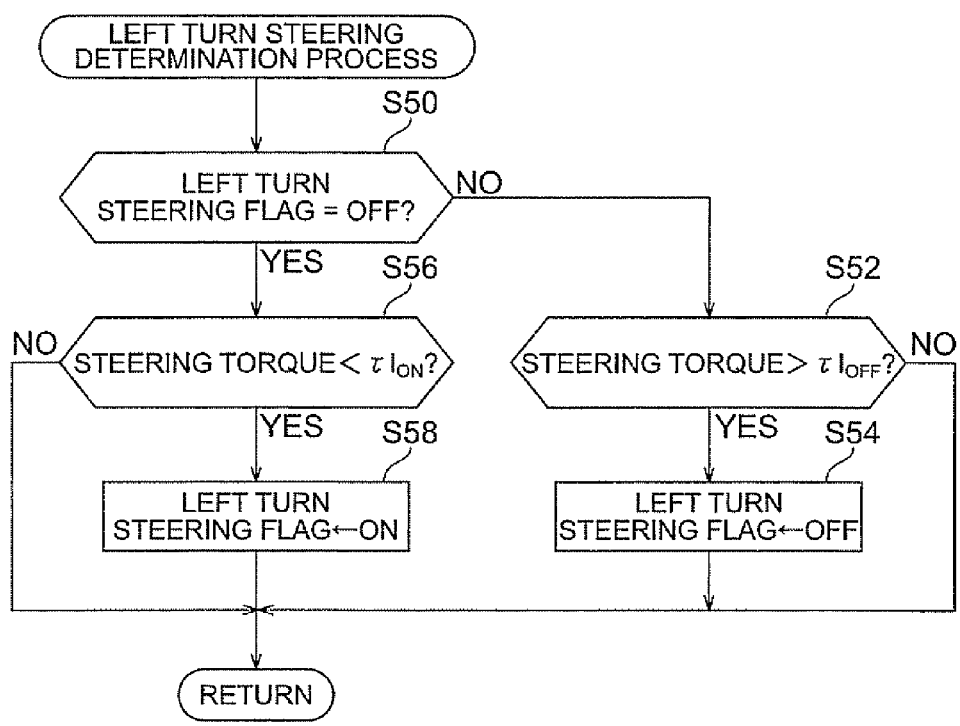
FIG. 7 is a flow chart depicting a left turn steering determination processing in the steering assist device in FIG. 1.

FIG. 7 is a flow chart depicting a left turn steering determination processing in the steering assist device 1 according to the present embodiment.

This left turn steering determination processing is a processing to determine whether the driver of the vehicle is steering to the left or not. A series of control processings in FIG. 7 are repeatedly executed by the ECU 20 at a predetermined cycle, for example.

First, as S50 in FIG. 7 shows, it is determined whether the left turn steering flag is OFF. The left turn steering flag is a flag to indicate whether the steering operation of the steering wheel is a left turn, and ON indicates that it is a left turn, and OFF indicates that it is not a left turn.

If it is determined that the left turn steering flag is not OFF in S50, it is determined whether the steering torque is greater than the torque value $\tau l_{OFF}$ (S52). The torque value $\tau l_{OFF}$ is a value which is set in the ECU 20 in advance, and a negative value is set. For the steering torque, a torque value detected by the torque sensor 8 is used.

If the steering torque is not greater than the torque value $\tau l_{OFF}$ in S52, it is determined that the left turn steering operation of the steering wheel is continuing, and the left turn steering determination processing ends. If the steering torque is greater than the torque value $\tau l_{OFF}$ in S52, on the other hand, the left turn steering flag is set to OFF (S54).

If it is determined that the left turn steering flag is OFF in S50, it is determined whether the steering torque is smaller than the torque value $\tau l_{ON}$ (S56). The torque value $\tau l_{ON}$ is a value which is set in the ECU 20 in advance, and is a negative value, which is also a value smaller than the torque value $\tau l_{OFF}$.

If the steering torque is not smaller than the torque value $\tau l_{ON}$ in S56, it is determined that the left turn steering operation of the steering wheel is not being performed, and the left turn steering determination processing ends. If the steering torque is greater than the torque value $\tau l_{ON}$ in S56, on the other hand, it is determined that left turn steering is performed, and the left turn steering flag is set to ON (S58). And the left turn steering determination processing ends.

According to this left turn steering determination processing, it can be determined whether the driver of the vehicle is steering to the left based on the steering torque of the steering wheel.

As described above, according to the steering assist device 1 of the present embodiment, the steering amount of turning the steering wheel at the curve entrance can be increased by increasing the change amount of the steering target value when the traveling path of the vehicle is at the curve entrance. Thereby a delay in the turning of the steering wheel at the curve entrance can be suppressed. As a result, the vehicle can travel following up the traveling path, and a steering assist control, which has excellent capability to follow up the traveling path, can be implemented.

Figure 8:
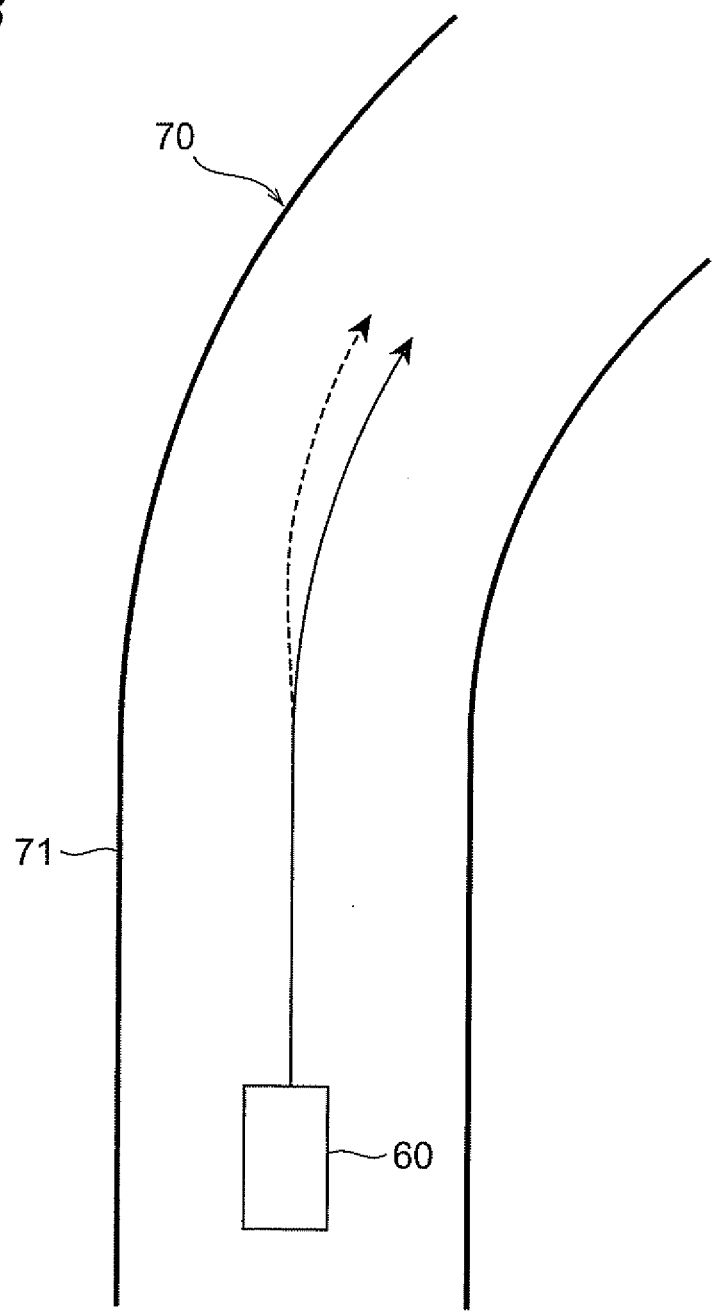
FIG. 8 is a diagram depicting the traveling of a vehicle according to the steering assist control in the steering assist device in FIG. 1.

For example, as FIG. 8 shows, by increasing the turning amount of the steering wheel of the vehicle 60 at an area 71 near the curve entrance of the traveling path 70, deviation of the vehicle 60 from the center position of the lane can be prevented. Therefore the capability of the vehicle 60 to follow up the traveling path at the curve entrance can be improved. Also a sense of incongruity of the driver of the vehicle 60 can be suppressed.

Also according to the steering assist device 1 of the present embodiment, a delay in the steering at the curve entrance can be suppressed, so passenger comfort and vehicle stability during steering assist control can be improved.

The above embodiment shows an example of the steering assist device according to the present invention. The steering assist device of the present invention is not limited to this, but the steering assist device according to the present embodiment may be modified without changing the essential spirit of each claim, or may be applied to other devices. For example, in the present embodiment, the present invention is applied to a device to assist the steering of the driver who steers a vehicle, but may be applied to a device which performs automatic steering. The present embodiment showed a case of relaxing the change restriction of the steering target value, by relaxing the restriction of the curvature change rate when the curvature of the traveling path is calculated, but the change restriction of the steering target value may be relaxed by relaxing the restriction of the change rate of the curve R of the traveling path or the change rate of the steering torque (e.g. current amount of the motor 5 to assist steering).

INDUSTRIAL APPLICABILITY

The present invention can perform steering assist control which has an excellent capability to follow up the traveling path by increasing the steering amount based on the steering control during traveling at the curve entrance.

The invention claimed is:

1. A steering assist device for calculating a steering target value based on a shape of a traveling path on which a vehicle travels, and assisting steering according to said steering target value, comprising:
    a controller that is configured to:
        determine whether or not the vehicle is traveling a curve entrance of said traveling path; and
        calculate the steering target value using a curvature value of the traveling path calculated where a noise reduction function of a filter to reduce noise of the curvature value is relaxed when it is determined that the vehicle is traveling the curve entrance of the traveling path, wherein the curve entrance is determined to exist upon an initial determination that an absolute value of a filtered curve curvature value is greater than or equal to an absolute value of a previous value of the filtered curve curvature value and that a curvature direction of a current curve curvature value and that of a previous curve curvature value are the same; and
    a steering unit that is configured to operate based on the steering target value.

2. The steering assist device according to claim 1, wherein the controller is configured to:
    calculate the steering target value using the curvature value when it is determined that the vehicle is traveling the curve entrance of the traveling path and a direction of the curve of the traveling path and a steering direction by the driver of the vehicle match.

* * * * *